United States Patent
Goral

(10) Patent No.: US 7,510,738 B2
(45) Date of Patent: Mar. 31, 2009

(54) FLAVOR-ENHANCING FOOD ADDITIVE

(75) Inventor: Daniel M. Goral, Antioch, IL (US)

(73) Assignee: Sokol and Company, Countryside, IL (US)

( * ) Notice: Subject to any disclaimer, the term of this patent is extended or adjusted under 35 U.S.C. 154(b) by 1159 days.

(21) Appl. No.: 10/348,790

(22) Filed: Jan. 22, 2003

(65) Prior Publication Data
US 2004/0142090 A1 Jul. 22, 2004

(51) Int. Cl.
*A23L 1/221* (2006.01)

(52) U.S. Cl. .................... 426/650; 426/643

(58) Field of Classification Search ............. 426/534, 426/641, 643, 650
See application file for complete search history.

(56) References Cited

U.S. PATENT DOCUMENTS

| 5,372,834 A | 12/1994 | Buckholz, Jr. et al. |
| 5,709,048 A | 1/1998 | Holtz |
| 2002/0151052 A1 | 10/2002 | Chaudhari et al. |

FOREIGN PATENT DOCUMENTS

| JP | 2002-027940 | 1/2002 |
| JP | 2002-027943 | 1/2002 |
| JP | 2002-142665 | 5/2002 |
| JP | 2002-176951 | 6/2002 |
| JP | 2003-104997 | 4/2003 |
| JP | 2003-235443 | 8/2003 |

OTHER PUBLICATIONS

Rombauer et al, Joy of Cooking, 1975 The Bobbs-Merrill Company, Inc., New York, pp. 343 and 350.*
Vietnamese Dipping Sauce, www.recipeland.com, submitted by Stephen Ceideburg, Jan. 22, 1991.*
Watercress Sauce, www.recipeland.com, 1996-2004.*
F.Shahidi: Flavor of Meat, Meat Products and Seafoods: *Blackie Academic & Professional*, 1998.
Greg Nelson et al.: An amino-acid taste receptor, *Nature AOP*, Feb. 2002.
Greg Nelson et al.: An amino-acid taste receptor, *Nature*. 199-202, vol. 416, Mar. 2002.
Park et al., "Chemical Composition of Fish Sauces Produced in Southeast and East Asian Countries," *Journal of Food Composition and Analysis*, 2001, pp. 113, 119, 122.

* cited by examiner

*Primary Examiner*—Leslie Wong
(74) *Attorney, Agent, or Firm*—Pauley Petersen & Erickson

(57) ABSTRACT

A flavor-enhancing product that consists essentially of fish sauce blended with anchovy paste. The blended product exhibits elevated umami taste intensity and improved flavor characteristics over those exhibited by fish sauce or anchovy paste individually.

11 Claims, No Drawings

FLAVOR-ENHANCING FOOD ADDITIVE

BACKGROUND OF THE INVENTION

This invention is directed to a flavor-enhancing product that exhibits a heightened umami sensation compared to the umami sensation of individual components within the product.

Umami is a relatively new term to North American food producers although Asian cultures, especially the Japanese, have recognized for many years that "deliciousness" is a unique and specific human taste. Domestic food producers use the general term "savory" to describe several umami characteristics in food products.

Recently the first real proof of this fifth taste sense possessed by humans, umami, has appeared in the scientific literature. Closely associated with tastes derived from various marine and meat products, umami is the taste of protein. It also tends to reduce the perception of sourness and bitterness and increase the perception of saltiness and sweetness. The resulting taste perception has been generally described as "delicious." Molecular biology studies have confirmed the physical presence of human taste receptors that respond to umami substances which are responsible for the delicious protein taste.

Monosodium glutamate (MSG) and the nucleotides inosine monophosphate (IMP) and guanosine monophosphate (GMP) are commonly recognized flavor enhancers. Current FDA regulations require that these chemical compounds be specifically identified on product ingredient statements. Many food producers will not use these compounds in their products because they believe consumers have a negative opinion of them. The industry continues to seek highly functional flavor enhancers with "clean" labels.

Most recently, IMP has been shown to greatly amplify the umami response of the taste receptor in the presence of various free amino acids and glutamate. When viewed in the light of these recent molecular biology studies, it is apparent that the careful selection and blending of common food products can create a wide range of exceptionally savory ingredients.

A large body of literature shows that many common natural foods contain free amino acids (especially glutamate) and nucleotides. These publications infer that the chemicals were responsible for the umami character of the food. Trained sensory panelists have been able to correlate the intensity of the umami taste with the actual content of individual umami compounds in a statistically significant manner.

Flavor enhancer manufacturers have promoted the concept that blending MSG and nucleotides increases the functionality of the blend. In other words, you can use less MSG when combined with a small amount of IMP or GMP, and even less MSG when combined with an IMP/GMP blend. The literature documents this synergy through sensory studies. There are no known references in the literature to blending natural products that contain these substances to achieve umami synergy.

There is a need or desire for a flavor-enhancing food additive made up of a blend of natural products that achieves umami synergy.

SUMMARY OF THE INVENTION

In response to the discussed difficulties and problems encountered in the prior art, an all-natural flavor-enhancing product that exhibits a heightened umami sensation has been discovered.

The flavor-enhancing product includes fish sauce blended with anchovy paste. Fish sauce is the liquid product formed when fish are salted and fermented (salt cured) for typically one year in temperatures that average around 30 degrees Centigrade. Anchovy paste is ground anchovy fish, hereafter "paste fish" that have been salted and fermented (salt cured) for typically 5 months or a suitable duration until the meat separates easily from the skeleton of the fish. The salt curing process for paste fish occurs at a temperature that averages around 18 degrees Centigrade.

The ratio of fish sauce to anchovy paste may vary considerably depending upon the desired flow characteristics and the intended application of the flavor enhancer. In any case, the flavor-enhancing product suitably includes between about 5% and about 95%, or between about 5% and about 50%, or between about 50% and about 95% by weight fish sauce, and between about 5% and about 95%, or between about 5% and about 50%, or between about 50% and about 95% by weight anchovy paste.

In at least one embodiment, the fish sauce is of Southeast Asian origin. Suitably, the fish sauce includes at least 0.8% glutamate, with between about 15 and about 48, or between about 30 and about 48 degrees nitrogen.

In at least one embodiment, the anchovy paste fish originates from Spain, Morocco, Argentina, Chile, or Peru. The anchovy paste fish should be fermented for at least 5 months or a suitable duration until the meat separates easily from the skeleton of the fish. Suitably, the anchovy paste includes at least 0.30% IMP and at least 0.005% GMP.

With the foregoing in mind, particular embodiments of the invention provide an all-natural, cost-efficient, flavor-enhancing product that exhibits an unexpectedly high umami intensity. Additionally, the invention expresses an improved umami taste quality over either of the individual components.

DESCRIPTION OF PREFERRED EMBODIMENTS

The present invention is directed to a flavor-enhancing product that consists essentially of fish sauce blended with anchovy paste. The blended product exhibits a higher umami intensity than exhibited by either fish sauce or anchovy paste individually.

Salt cured anchovy is used as a natural flavor enhancer in many common foods such as Caesar dressings, Worcestershire sauce, Asian fish sauce, and Marinara pasta sauces. Flavor enhancement is the primary function of anchovy in these food systems. Few, if any, product developers realize how much flavor enhancement is attributable to anchovy. Anchovy producers know that specific varieties of fish taste more delicious than others. Also, the quality of the fermentation/cure greatly affects the taste of the finished product.

It has been discovered that blending selected types of fermented anchovy greatly improves the flavor enhancement function of anchovies in general, resulting in a more functional, cost-effective anchovy product which can be added to various foods, such as sauces or dressings, to greatly enhance the flavors of such foods.

Two types of fermented fish are blended together to create the flavor enhancer of the invention. One type of fermented fish, in the form of fish sauce, has a high free amino acid and high glutamate content and the other type of fermented fish, in the form of anchovy paste, has a relatively high content of nucleotides. These qualities are a result of using different species of anchovy and fermenting them in different ways.

Fish sauce is a basic condiment, most popular in the Far East. Rich in glutamate and other free amino acids, fish sauce not only adds flavor to foods but also adds nutrients without adding any fat. Fish sauce is typically classified by amino acid content. More specifically, fish sauce generally ranges from about 10 degrees to about 48 degrees, with "degree" referring to the amount of nitrogen in grams/liter. The higher the degree, the more protein is present in the fish sauce. The amount of protein, or amino acid content, generally controls the quality of the fish sauce. Higher quality fish sauce typically has a higher degree. The fish sauce used in the present invention is suitably between about 15 and 48 degrees, or between about 30 and 48 degrees. If the fish sauce has too little nitrogen in it, such as 10 degree fish sauce, it can reduce the quality of the flavor-enhancer of the invention.

Fish sauce is generally made from anchovies. The fish sauce in the present invention is suitably made of fish of Southeast Asian origin. As used herein, the term "origin" or "originating" refers to the geographical area, or waters surrounding the geographical area, in which a fish was caught. Anchovies that swim in the warm waters off of Vietnam and Thailand, as well as other areas in Southeast Asia, are typically softer and smaller than their colder water counterparts in South America, Spain and Morocco, for example. The amino acid composition of the flesh of anchovies in Southeast Asia differs considerably from the composition of the flesh in colder water anchovy varieties. In Southeast Asia, anchovies are generally caught by scooping a school of anchovies and any other marine life in the vicinity of the anchovies. Consequently, Southeast Asian fish sauce, or fish sauce made from Southeast Asian fish, usually includes about 95 to about 98% anchovy with the remaining 2 to 5% made up of mackerel or various other small fish varieties and shrimp.

Fish sauce is comparable to barrel brine that results in the production of anchovy paste fish, since both products have the same essential ingredients of anchovies, salt, and water. However, fish sauce differs from barrel brine in several ways. Comparing Southeast Asian fish sauce to the barrel brine created during the production of anchovy paste, particularly anchovy paste made of anchovies originating in South America, Spain or Morocco, Vietnamese fish sauce fermentation yields more glutamate content in half the time of the barrel brine from Argentina, Spain or Morocco. More specifically, Vietnamese fish sauce fermentation generally takes about a year while barrel brine from anchovy paste made from fish originating in Argentina, Spain or Morocco would typically have to age about 1.5-2 years to achieve similar glutamate levels. Additionally, fish sauce is a standardized product with consistent functionality, unlike barrel brine which varies considerably from drum to drum. Brine varies from a thick, brown protein soup to a thin, watery brine. While not considered a waste product like barrel brine, fish sauce is still a low cost raw material that adds little cost to the flavor enhancer of the invention.

Specific varieties of regional Vietnamese fish sauce having a wide variety of free amino acids in relatively high concentrations are particularly suitable for the flavor enhancer of the invention. Such varieties of fish sauce contain glutamate concentrations that are equal to or greater than the best barrel brine.

Unlike fish sauce which is essentially free of nucleotides, anchovy paste is rich in nucleotides, namely inosine monophosphate (IMP) and guanosine monophosphate (GMP). The anchovy paste used to make the flavor enhancer of the invention is suitably made from fish originating in Spain, Morocco, or South America, namely Argentina, Chile, or Peru. Anchovies that swim in the cold waters off of these countries typically have a higher fat content and firmer flesh than their counterparts in Southeast Asia.

Anchovy paste is made with a variety of anchovies whose meat produces substantial IMP and GMP concentrations when salt cured for a suitable duration. The IMP and GMP contributions increase with the duration of the fermentation. Anchovy paste is made from salt cured anchovies. In this process the anchovies are salted, deheaded, and placed into barrels or other containers. Weights are applied to the tops of the containers to press the fish, and regulate the curing process. The anchovies must be aged, or fermented, for a sufficient duration of time, which allows naturally occurring enzymes to break down the protein. A typical fermentation period may last between about 5 and about 18 months depending on the variety of anchovy and the temperature of the local climate. The anchovies used to make the anchovy paste in the present invention are suitably fermented until the meat separates easily from the skeleton of the fish. The barrel brine present during the curing process is typically discarded. The fish are ground to a paste like consistency. Water and salt may be added to standardize the paste made from the ground fish flesh.

By blending the nucleotide-rich anchovy paste with fish sauce that is rich in glutamate and other free amino acids, a flavor-enhancing product with increased umami expression and a rich full umami taste is produced. A synergistic effect takes place in this blend, with the blend having greater umami expression than either the anchovy paste or the fish sauce measured alone. Furthermore, the unpleasant odor of fish sauce is at least partially masked by the anchovy paste. Anchovy paste fish have a significant fat content. Oxidized fish fats and oils contribute to the undesirable fishy flavor in anchovy paste. Since the fish sauce is fat free, when fish sauce and anchovy paste are combined, the fish sauce reduces the fat content of the blend compared to the paste alone. The blend therefore has less oxidized fishy flavors than the paste alone and less unpleasant odor than the fish sauce alone, but greater umami expression.

While not wishing to be bound by theory, it appears that the combination of glutamate and nucleotides is responsible for the synergistic flavor enhancement that results from the combination of fish sauce and anchovy paste. Fish sauce is selected to have a glutamate level, which is greater than or equal to the levels of glutamate found in cured anchovy paste fish. This selection process ensures that the glutamate levels in the finished product remain constant or increase in the blended product. Anchovy paste is composed of the ground flesh of cured anchovy paste fish that contain nucleotides, which contribute to the flavor enhancer of the invention. One of the nucleotides, IMP, in particular, greatly amplifies the umami expression of the amino acids, as explained in an article entitled "An Amino-Acid Taste Receptor," by Greg Nelson, et al., published in Nature, Vol. 416, 14 Mar. 2002, herein incorporated by reference. Fish sauce has no nucleotides but does contain other free amino acids besides glutamate, and free amino acids are umami substances in themselves.

The percentages of each of the ingredients in the flavor-enhancing product may vary depending upon the food to which the flavor enhancer will be applied. In general, the flavor enhancer may include between about 5% and about 95% by weight fish sauce and between about 5% and about 95% by weight anchovy paste. In one embodiment of the invention, half or more of the flavor enhancer may consist of fish sauce, with between about 50% and about 95% by weight fish sauce and between about 5% and about 50% by weight anchovy paste. In another embodiment of the invention, half or more of the flavor enhancer may consist of anchovy paste, with between about 5% and about 50% by weight fish sauce and between about 50% and about 95% by weight anchovy paste.

For example, aged cheese, which is typically included in Caesar salad dressing, includes glutamate. The nucleotides in anchovy paste work with the glutamate in the aged cheese to enhance the umami expression. Therefore, a flavor enhancer in accordance with the invention, when used as an additive in Caesar salad dressing, requires a higher percentage of anchovy paste than fish sauce. As another example, a flavor enhancer in accordance with the invention, when used as an additive to foods that include nucleotide-containing mushrooms, generally requires a higher percentage of fish sauce than anchovy paste.

Another consideration that must be taken into account when determining the amount of each ingredient to include in the flavor enhancer is the desired flow characteristics of the resulting product. A blend including a higher percentage of fish sauce may be poured from a container, such as a bottle, jug, or drum, but a blend including a higher percentage of anchovy paste might instead be spooned from a jar, pail or squeezed from a foil-laminated bag within a box. One example of a flavor enhancer of the invention having such a consistency includes 11.5% fish sauce and 88.5% anchovy paste and can be easily squeezed from a foil bag.

Overall umami functionality is directly related to the concentration of individual umami compounds. The expression of a rich, full umami taste is a function of the composition of the different umami substances. Since the blended product contains MSG, nucleotides, and a wide variety of free amino acids, it provides superior rendering of the preferred rich, full umami taste as compared to either fish sauce or anchovy paste. Because umami reduces perceived sourness, it may be particularly beneficial to elevate the umami in acidified foods such as salad dressings and tomato-based pasta sauces. This strategy allows lowering the pH, thus improving shelf life characteristics, without increasing the perceived sourness of the product.

As taught in Critical Reviews in Food Science and Nutrition, Vol. 18, 1983, pages 231-312, incorporated herein by reference, J. A. Maga shows the individual taste thresholds for various umami compounds, alone and in combination with each other, can be determined and are summarized in Table 1.

TABLE 1

Umami compound taste thresholds

| Compound | Taste threshold (%) |
|---|---|
| MSG | 0.012 |
| IMP | 0.014 |
| GMP | 0.0035 |
| IMP + GMP | 0.0063 |
| IMP + GMP + MSG | 0.000031 |

As shown in Table 1, even though IMP alone has a threshold that is an order of magnitude higher than that for GMP alone, when IMP and GMP are combined in equal proportions the threshold is considerably less than either IMP or GMP alone. Most astounding is the threshold of a combination of equal portions of IMP, GMP, and MSG, which is by far less than any IMP, GMP, or MSG alone. Therefore, umami enhancement can be achieved with even very small amounts of these elements when the elements are in combination with one another. Analytical tests have verified that fish that taste more delicious contain more umami compounds.

The flavor-enhancing product of the invention can be made by first procuring the fish sauce made from Southeast Asian anchovies and the anchovy paste made from anchovies from Spain, Morocco, Argentina, Chile, or Peru. Alternatively, naturally fermented anchovy products of another form or originating from other areas around the world may be analyzed to determine whether appropriate umami compounds are present, namely the same umami compounds present in Southeast Asian fish sauce and Spanish, Moroccan, or South American anchovy paste, as described herein.

Quantitative analytical tests have been developed to prove the existence of MSG, IMP, GMP and other free amino acids in anchovy products. Using chromatographic analysis, it has been found that cured anchovy paste fish contain a significant amount of the nucleotides IMP and GMP. More specifically, the anchovy paste used to form the flavor enhancer of the invention should have at least 3.0 milligrams/gram (0.30%) IMP and at least 0.05 mg/g (0.005%) GMP. Also, the fish sauce used to form the flavor enhancer of the invention should have at least 1.0% glutamate.

The fish sauce may either be blended into the anchovy paste, or the anchovy paste may be blended into the fish sauce, at a ratio suitable to achieve a desired consistency, taking into account the intended application of the finished product and thereby adjusting the ratio if necessary to achieve heightened umami expression in the blended product.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A flavor-enhancing food additive, consisting essentially of a first fermented anchovy product blended with a second fermented anchovy product, wherein the first fermented anchovy product is made from fish of Southeast Asian origin, comprises at least 0.8% glutamate, and is between about 15 and about 48 degrees nitrogen, and the second fermented anchovy product is made from fish originating from at least one of the group consisting of Spain, Morocco, Argentina, Chile, and Peru and comprises at least 0.30% IMP and at least 0.005% GMP, and the flavor-enhancing food additive exhibits a greater umami expression than either the first fermented anchovy product or the second fermented anchovy product.

2. The flavor-enhancing food additive of claim 1, comprising between about 5% and about 95% by weight first fermented anchovy product and between about 5% and about 95% by weight second fermented anchovy product.

3. The flavor-enhancing food additive of claim 1, comprising between about 50% and about 95% by weight first fermented anchovy product and between about 5% and about 50% by weight second fermented anchovy product.

4. The flavor-enhancing food additive of claim 1, comprising between about 5% and about 50% by weight first fermented anchovy product and between about 50% and about 95% by weight second fermented anchovy product.

5. The flavor-enhancing food additive of claim 1, wherein the first fermented anchovy product is between about 30 and about 48 degrees nitrogen.

6. The flavor-enhancing food additive of claim 1, wherein the second fermented anchovy product has been fermented for at least 5 months.

7. A flavor-enhancing food additive, consisting essentially of:

between about 5% and about 95% by weight fish sauce having between about 15 and about 48 degrees nitrogen, comprising at least one free amino acid, and made from fish originating from Southeast Asia; and between about 5% and about 95% by weight anchovy paste comprising at least one nucleotide and made from fish originating from at least one of the group consisting of Spain, Morocco, Argentina, Chile, and Peru, which have been fermented for at least 5 months;

wherein the flavor-enhancing food additive exhibits a greater umami expression than either the fish sauce or the anchovy paste.

8. The flavor-enhancing food additive of claim 7, comprising between about 50% and about 95% by weight fish sauce and between about 5% and about 50% by weight anchovy paste.

9. The flavor-enhancing food additive of claim 7, comprising between about 5% and about 50% by weight fish sauce and between about 50% and about 95% by weight anchovy paste.

10. The flavor-enhancing food additive of claim 7, wherein the fish sauce has between about 30 and about 48 degrees nitrogen.

11. A method of making a flavor-enhancing food additive, comprising the steps of:

providing fish sauce made from fish of Southeast Asian origin and comprising at least one free amino acid;

providing anchovy paste made from fish originating from at least one of the group consisting of Spain, Morocco, Argentina, Chile, and Peru and comprising at least one nucleotide; and blending between about 5% and about 95% by weight of the fish sauce and between about 5% and about 95% by weight of the anchovy paste together to form the flavor-enhancing food additive consisting essentially of the fish sauce and the anchovy paste.

* * * * *